Oct. 30, 1928.

A. R. RUTTER 1,689,843

MAGNET STRUCTURE

Filed July 6, 1926

WITNESSES:
A. J. Schiefelbein
F. H. Miller

INVENTOR
Argyle R. Rutter
BY
Wesley G. Carr
ATTORNEY

Patented Oct. 30, 1928.

1,689,843

UNITED STATES PATENT OFFICE.

ARGYLE R. RUTTER, OF FOREST HILLS, PENNSYLVANIA, ASSIGNOR TO WESTINGHOUSE ELECTRIC & MANUFACTURING COMPANY, A CORPORATION OF PENNSYLVANIA.

MAGNET STRUCTURE.

Application filed July 6, 1926. Serial No. 120,594.

My invention relates to magnet structures and particularly to laminated magnet-core structures for induction meters and motors.

One object of my invention is to so compensate for minor discrepancies, such as variations in dimensions, thickness and texture of similar punchings constituting the laminated structure, as to ensure more uniform flux characteristics and, therefore, more accurate operation of the device in or with which the magnet is employed.

Another object of my invention is to provide means for rendering a watthour or similar meter more accurate in operation, particularly under light-load conditions.

In magnet structures, such as those used as cores of watthour and other induction meters, it has been usual to build the structures from punchings made by a single die, the punchings being ordinarily merely piled one upon another as they came from the die.

It has been found, in such structures, that minor variations in thickness, texture and dimensions cause errors not ordinarily to be expected in symmetrically built-up structures of this character and that a slight discrepancy at one local position in each of the several punchings causes a cumulative error in the assembled device.

Such errors are particularly likely to occur in watthour meters under light-load conditions, where, by reason of weak actuating fluxes and low torque, minor adverse influences are apt to cause greater percentages of error than under heavy-load conditions.

Accordingly, in practicing my invention to remedy the above-mentioned conditions, I provide a laminated structure in which the several punchings are so disposed relative to each other as to ensure more uniform flux characteristics and better operation of the assembled structure.

Figure 1:
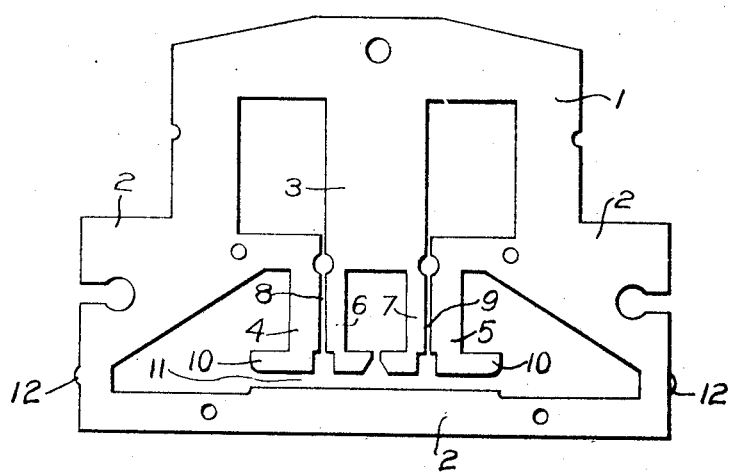
Figure 2:
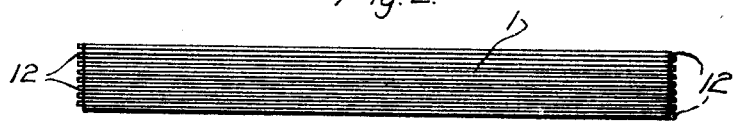
Figure 3:
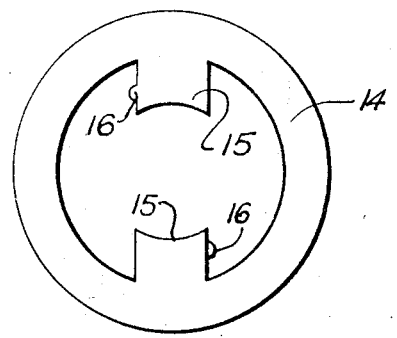

Figure 1 of the accompanying drawings is a side elevational view of a magnet structure constructed in accordance with my invention, Fig. 2 is a bottom plan view of the structure shown in Fig. 1, and Fig. 3 is a view, similar to Fig. 1, of a modified form of meter or motor-field-magnet-core structure embodying my invention.

Referring to Figs. 1 and 2, the structure shown is representative of a laminated induction-meter field-core structure of usual form built up of layers 1 of magnetizable sheet material and comprising an outer perimetral portion 2, a main shunt-pole portion 3 and two series-pole portions 4 and 5 projecting inwardly from the perimetral portion 1.

The shunt-pole portion 3 is provided with spaced projecting portions 6 and 7 disposed in slightly spaced relation to the series-pole portions 4 and 5, respectively, to provide an air gap 8 between the portions 4 and 6 and an air gap 9 between the portions 7 and 5. A shunt coil (not shown) is adapted to surround the pole portion 3, and series coils (not shown) are adapted to surround the portions 4 and 6 and 7 and 5, respectively.

The portions 4, 5, 6 and 7 are provided with laterally projecting end horns 10 disposed in slightly spaced relation to one section of the outer perimetral portion 2 to provide an air gap 11 in which a disc armature (not shown) is adapted to rotate.

The above structure, as so far described, is merely representative of one induction or watthour meter magnet core of standard form for which others might be substituted, so far as my invention is concerned, and is presented merely for purposes of illustration.

In such structures, the laminations or layers are usually made as punchings from the same or similar dies and are piled up directly as they come from the punch press. Thus, where minor discrepancies occur, such as variations in thickness, texture and dimensions, there may be uneven flux distribution in the core structure and across the air gaps, such as the gaps 8, 9 and 11 of Fig. 1.

Under weak or light-load conditions in a watthour meter, such discrepancies are more manifest, in that they more adversely affect the meter than under the higher loads.

It has been found that, to arrange the laminations alternately in reverse-face direction, a discrepancy that exists throughout the laminations at one side thereof before they are so arranged may be so evenly distributed or balanced as to greatly improve the operation of the structure.

In other words, assume an error in the dimensions of the die that would cause a burr or projection 12 at the same local position at one side of each of the punchings. These projections are greatly exaggerated from any found in usual practice, but are so shown for clearness of illustration.

If the laminations, having such dimensional errors, are received and piled up directly from the punch press, the burrs 12 are all at one side of the structure and the error caused thereby is accordingly cumulative.

As shown in Figs. 1 and 2, this error is compensated to a large degree by turning the alternate laminations through an angle of one hundred and eighty degrees about a vertical central axis relative to the others, so that the burrs 12 shall be distributed equally on opposite sides of the assembled structure.

By the above procedure, errors caused by discrepancies in thickness and texture are similarly reduced.

As shown in Fig. 3, a cylindrical laminated core structure 14 having pole portions 15 is similarly compensated for unevenness caused by burrs 16 by turning the alternate laminations through an angle of one hundred and eighty degrees about a horizontal axis normal to the plane of the figure.

It is to be understood that, whether the alternate laminations be turned about vertical or horizontal axes, as above set forth, depends somewhat upon the shapes of the various structures with which my invention may be employed, the service for which they are adapted and the degree of compensation sought.

In certain structures, both the vertical and horizontal turning may be employed, the degree of the angle may be other than one hundred and eighty degrees and various other combinations besides turning every other or alternate laminations may be employed. Thus, the laminations may be turned about face, as in Figs. 1 and 2, or merely through an angle about the horizontal axis, as in Fig. 3, in groups of any number and it is to be understood that, while I have shown and described particular forms of my invention, various changes and modifications may be made therein without departing from the spirit and scope thereof, as set forth in the appended claims.

I claim as my invention:

1. A magnet-core structure comprising a laminated body built up of similar layers, each having a closed perimetral portion and three portions projecting inwardly therefrom to provide a main central shunt-pole portion and two series-pole elements, each including a portion of the shunt-pole portion, said layers being disposed with said perimetral and projecting portions in adjacent surface-to-surface register and alternate layers being positioned in reverse-face direction relative to the others.

2. A laminated magnet core structure, the laminæ of which are substantially alike and are so disposed that substantially their entire adjacent surfaces are in contacting relation, some of said laminæ being reversely disposed relatively to the others, each of said laminæ comprising a coil receiving portion disposed within the periphery thereof for the reception of the windings of an induction meter.

3. A laminated magnet core structure, the laminæ of which are substantially alike and are so disposed that substantially their entire adjacent surfaces are in contacting relation, some of said laminæ being reversely disposed relatively to the others, each of said laminæ comprising a plurality of portions within the periphery thereof for the reception of the windings of a watthour meter.

4. In an electrical instrument, a laminated magnet-core structure having substantially uniform flux characteristics comprising a plurality of laminæ disposed in alternately reversed face-to-face relation, whereby inequalities in the laminæ resulting from the manufacturing operations thereon are uniformly distributed with respect to a major axis of the core.

In testimony whereof, I have hereunto subscribed my name this 24th day of June, 1926.

ARGYLE R. RUTTER.